(12) United States Patent
Pati et al.

(10) Patent No.: US 11,189,114 B2
(45) Date of Patent: Nov. 30, 2021

(54) VEHICLE CONTROL SYSTEM

(71) Applicant: GE Global Sourcing LLC, Norwalk, CT (US)

(72) Inventors: Dibyajyoti Pati, Bangalore (IN); Ashish Anil Paralikar, Bangalore (IN); Mohankumar Nanjegowda, Bangalore (IN); Prakarsh Paritosh, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 243 days.

(21) Appl. No.: 16/455,109

(22) Filed: Jun. 27, 2019

(65) Prior Publication Data

US 2019/0318553 A1   Oct. 17, 2019

Related U.S. Application Data

(63) Continuation-in-part of application No. 15/959,264, filed on Apr. 22, 2018, now Pat. No. 10,902,688.
(Continued)

(51) Int. Cl.
*G07C 5/08* (2006.01)
*G07C 5/00* (2006.01)
(Continued)

(52) U.S. Cl.
CPC .......... *G07C 5/0808* (2013.01); *B60W 30/18* (2013.01); *B60W 50/0097* (2013.01);
(Continued)

(58) Field of Classification Search
CPC ...... G07C 5/0808; G07C 5/008; G07C 5/085; G07C 5/0841; G01C 21/00;
(Continued)

(56) References Cited

U.S. PATENT DOCUMENTS 5,832,400 A * 11/1998 Takahashi ............. B60W 30/18
                                                        701/53
8,249,763 B2 * 8/2012 Brooks ................... B61L 3/006
                                                        701/20
(Continued)

OTHER PUBLICATIONS

Dang et al., "Analyzing the Sea Weather Effects to the Ship Maneuvering in Vietnam's Sea from BinhThuan Province to Ca Mau Province Based on Fuzzy Control Method", Telkomnika; vol. 16, No. 2; Apr. 2018; pp. 533-543; ISSN: 1693-6930, accredited A by Dikti; Decree No. 58/DIKTI/Kep/2013; DOI: 10.12928/TELKOMNIKA.v16i2.7753 (12 pages).
(Continued)

*Primary Examiner* — Hunter B Lonsberry
*Assistant Examiner* — Luis A Martinez Borrero
(74) *Attorney, Agent, or Firm* — The Small Patent Law Group LLC; Mary D. Lawlor

(57) ABSTRACT

Ambient conditions in which a marine vessel is to travel along a path are determined. Power settings for the marine vessel to travel along the path are determined based on the ambient conditions to direct the marine vessel to travel along a planned trajectory toward a designated location. Movement of the marine vessel is monitored while using the power settings and a discrepancy between movement of the marine vessel and the planned trajectory is identified. The power settings are automatically modified based on the discrepancy. Movement of the marine vessel then controlled according to the modified power settings.

21 Claims, 8 Drawing Sheets

Related U.S. Application Data which is a continuation of application No. 15/146,715, filed on May 4, 2016, now Pat. No. 9,953,472.

(51) Int. Cl.
| | |
|---|---|
| *B60W 50/00* | (2006.01) |
| *G01C 21/00* | (2006.01) |
| *B60W 30/18* | (2012.01) |
| *G01C 7/04* | (2006.01) |
| *B60W 40/076* | (2012.01) |

(52) U.S. Cl.
CPC ............ *G01C 21/00* (2013.01); *G07C 5/008* (2013.01); *B60W 40/076* (2013.01); *B60W 2552/15* (2020.02); *B60W 2556/50* (2020.02); *B60W 2720/103* (2013.01); *G01C 7/04* (2013.01)

(58) Field of Classification Search
CPC ............ G01C 21/3469; G01C 21/3617; G01C 21/34; B60W 50/0097; B60W 30/18; B60W 10/06; B60W 50/0098; B60W 50/14
See application file for complete search history.

(56) References Cited

U.S. PATENT DOCUMENTS

| | | | | |
|---|---|---|---|---|
| 8,626,366 | B2* | 1/2014 | Noffsinger | G05D 1/0206 |
| | | | | 701/21 |
| 8,655,521 | B2* | 2/2014 | Brooks | B61L 3/006 |
| | | | | 701/20 |
| 9,079,589 | B2* | 7/2015 | Cooper | B61L 3/006 |
| 9,156,477 | B2* | 10/2015 | Cooper | B61C 17/12 |
| 9,545,854 | B2* | 1/2017 | Daum | B60L 53/65 |
| 9,580,093 | B2* | 2/2017 | DeSanzo | B61L 27/00 |
| 9,953,472 | B2* | 4/2018 | Pati | G07C 5/0808 |
| 10,794,708 | B2* | 10/2020 | Akuzawa | B63B 79/40 |
| 10,795,366 | B1* | 10/2020 | Arbuckle | B63H 25/02 |
| 10,902,688 | B2* | 1/2021 | Pati | B60W 50/0097 |
| 2008/0201028 | A1* | 8/2008 | Brooks | B61L 3/006 |
| | | | | 701/20 |
| 2010/0168942 | A1* | 7/2010 | Noffsinger | B63B 49/00 |
| | | | | 701/21 |
| 2011/0196601 | A1* | 8/2011 | Miura | G01C 21/3697 |
| | | | | 701/532 |
| 2011/0257869 | A1* | 10/2011 | Kumar | B61L 25/025 |
| | | | | 701/103 |
| 2012/0277941 | A1* | 11/2012 | Noffsinger | G01C 21/20 |
| | | | | 701/21 |
| 2012/0310453 | A1* | 12/2012 | Brooks | B61L 3/006 |
| | | | | 701/20 |
| 2012/0316717 | A1* | 12/2012 | Daum | B60L 53/665 |
| | | | | 701/22 |
| 2015/0149135 | A1* | 5/2015 | Tervo | G06F 30/20 |
| | | | | 703/8 |
| 2015/0232097 | A1* | 8/2015 | Luther | B61L 3/006 |
| | | | | 701/123 |
| 2016/0257309 | A1* | 9/2016 | Kumar | G05B 13/021 |
| 2017/0323495 | A1* | 11/2017 | Pati | G07C 5/0808 |
| 2018/0186357 | A1* | 7/2018 | Deshpande | B60W 10/08 |
| 2020/0149996 | A1* | 5/2020 | Seenumani | F02D 29/02 |

OTHER PUBLICATIONS

Nilsson, "The Effect of Weather On a Ship's Speed (U)" Ranrl Technical Note No. 4/77, DOD, Defence Science and Technology Organisation; AR No. AR-001-009; Commonwealth of Australia; Oct. 1977 (33 pages).

* cited by examiner

VEHICLE CONTROL SYSTEM

CROSS-REFERENCE TO RELATED APPLICATIONS

This application is a continuation-in-part of U.S. patent application Ser. No. 15/959,264, filed 22 Apr. 2018, which is a continuation of U.S. patent application Ser. No. 15/146,715, filed 4 May 2016. The entire disclosures of these applications are incorporated herein by reference.

FIELD

Embodiments of the subject matter described herein relate to systems that control movements of vehicles based on discrepancies between designated and identified operational settings of the vehicles. Other embodiments relate to systems that identify errors in route grades and/or damaged routes.

BACKGROUND

Vehicle systems, such as automobiles, mining equipment, rail vehicles, over-the-road truck fleets, marine vessels, and the like, may operate according to a predetermined trip plan. The trip plan may designate speeds or power settings of the vehicle system. Travel according to the trip plan can reduce fuel consumption and/or emission generation by the vehicle system.

The trip plan may be based on a variety of data, such as weight of the vehicle system, grades of the route, or other information. If some of this data is erroneous, however, the vehicle system may not travel efficiently (e.g., may consume more fuel and/or generate more emissions than the trip plan). For example, the trip plan may be based on incorrect grades of the route, where the actual grade is steeper or less steep than the grade on which the trip plan is based. By traveling at operational settings of a trip plan that are based on incorrect grades, the vehicle system may produce more emissions, consume more fuel, have a delayed arrival to the end destination, travel at speeds that exceed speed limits, and the like.

BRIEF DESCRIPTION

In one embodiment, a system includes one or more processors configured to determine one or more ambient conditions in which a vehicle is to travel along one or more paths. The one or more processors also are configured to determine first power settings for the vehicle to travel along the one or more paths based on the one or more ambient conditions that are determined. The first power settings are determined to direct the vehicle to travel along a planned trajectory toward a designated location. The one or more processors also are configured to monitor movement of the vehicle while using the first power settings and to identify a discrepancy between the movement of the vehicle and the planned trajectory. The one or more processors also are configured to automatically modify at least some of the first power settings into different, second power settings based on the discrepancy that is identified. The one or more processors are configured to determine the second power settings to return the movement of the vehicle back toward the trajectory toward the designated location or along a different trajectory toward the designated location. The one or more processors are configured to communicate control signals to a propulsion system of the vehicle to automatically control the movement of the vehicle according to the second power settings.

In one embodiment, a method includes determining one or more ambient conditions in which a vehicle is to travel along one or more paths and determining first power settings for the vehicle to travel along the one or more paths based on the one or more ambient conditions that are determined. The first power settings are determined to direct the vehicle to travel along a planned trajectory toward a designated location. The method also includes monitoring movement of the vehicle while using the first power settings, identifying a discrepancy between the movement of the vehicle and the planned trajectory, automatically modifying at least some of the first power settings into different, second power settings based on the discrepancy that is identified and to return the movement of the vehicle back toward the trajectory toward the designated location or along a different trajectory toward the designated location, and controlling a propulsion system of the vehicle to automatically control the movement of the vehicle according to the second power settings.

In one embodiment, a system includes one or more processors configured to determine one or more ambient conditions in which a marine vessel is to travel along one or more water paths. The one or more processors also are configured to determine first operational settings for the marine vessel to travel along the one or more water paths based on the one or more ambient conditions of the water paths that are determined. The first operational settings are determined to direct the marine vessel to travel along a planned trajectory toward a designated location. The one or more processors also are configured to monitor movement of the marine vessel while using the first operational settings and to identify a discrepancy between the movement of the marine vessel and the planned trajectory. The one or more processors also are configured to automatically modify at least some of the first operational settings into different, second operational settings based on the discrepancy that is identified. The one or more processors are configured to determine the second operational settings to return the movement of the marine vessel back toward the trajectory toward the designated location or along a different trajectory toward the designated location.

BRIEF DESCRIPTION OF THE DRAWINGS

The subject matter described herein may be understood from reading the following description of non-limiting embodiments, with reference to the attached drawings, wherein.

DETAILED DESCRIPTION

Figure 1:
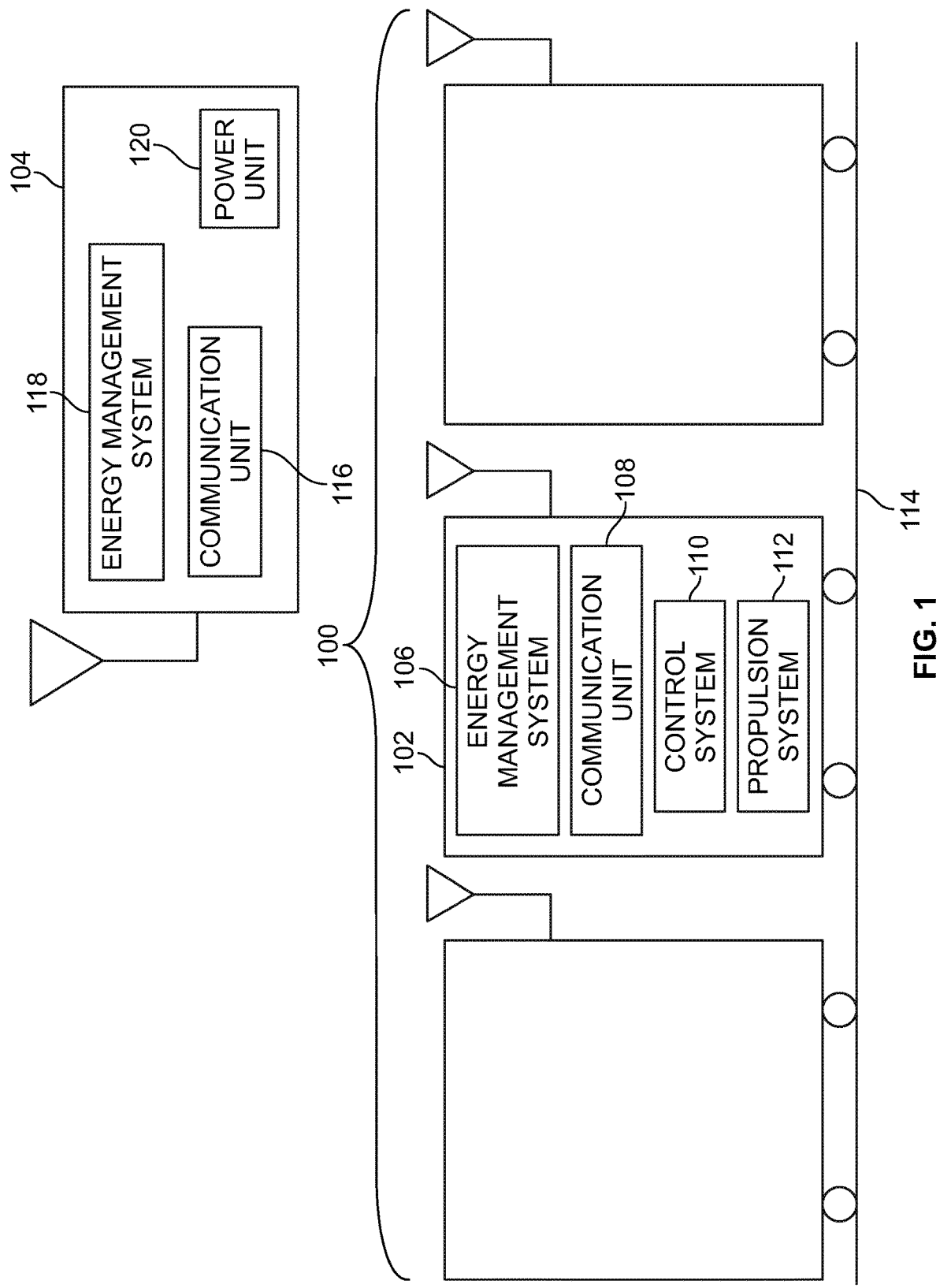
FIG. 1 is a schematic illustration of a vehicle system according to one example.

One of more embodiments of the inventive subject matter described herein relate to systems and methods that identify differences between vehicle designated operational settings (e.g., power settings) of a trip plan and vehicle-controlled power settings to determine differences between the designated grade of the route and actual grades of the route. Optionally, the designated power settings may be used to determine the health of the route. The systems and methods compare the designated power settings and the vehicle-controlled powers settings to identify errors in grades along the route. The grade error locations can be used to determine whether the grade error is a positive grade error or a negative grade error, as well as the amount of correction that should be applied to the designated power settings of the trip plan to cause a vehicle to move toward a designated speed of the trip plan.

The systems and methods can be used to determine discrepancies between the designated grades of the route of the trip plan and the actual grades of the route. Based on the discrepancies that are determined, the systems and methods can further schedule inspection of the route, modify the trip plan during movement of the vehicle along the route, and can update the designated grades of the route based on one or more differences between the designated power settings of the trip plan and the vehicle-controlled power settings. The systems and methods described herein can be used to improve trip efficiency. The systems and methods can further be used to determine a route "health" factor to categorize the state of the route.

Optionally, the trip plan can be created based on expected ambient conditions (and optionally other information as described herein). For example, the trip plan can be created based on forecasted or predicted wind speed, wind direction, water current speed, precipitation, water depth, or the like. The vehicle(s) can travel according to the operational settings dictated by the trip plan (and based on the expected ambient conditions). In the event that the ambient conditions around the vehicle differ from the expected ambient conditions, operation of the vehicle according to the operational settings of the trip plan may not result in the vehicle arriving at a location within a scheduled time, may result in the vehicle creating more emissions, may result in the vehicle consuming more fuel, may result in the vehicle traveling slower or faster, etc., than if the ambient conditions were closer to or identical to the expected ambient conditions. The system can modify the trip plan (e.g., an upcoming portion of the trip plan or a remainder of the trip plan) based on differences between the ambient conditions experienced by the vehicle(s) and the expected ambient conditions. For example, the operational settings of the remainder of trip plan can be modified so that the vehicle(s) more closely follow a planned trajectory or schedule of the vehicle(s) (for which the trip plan was created to achieve) given the different ambient conditions.

Optionally, a trip plan can be created based on locations of a shoreline. The trip plan can include trajectories, directions, headings, moving speeds, etc., to ensure that the marine vessel remains a designated distance or within a designated range of distances from a shoreline (the interface between the body of water being traveled within and land). This distance or range of distances can be set to ensure that the marine vessel remains at least as far as the designated distance from the shoreline (where the designated distance represents a minimum distance from the shoreline), that the marine vessel remains no farther than the designated distance from the shoreline (where the designated distance represents a maximum distance from the shoreline), or that the marine vessel remains no closer than a minimum distance from the shoreline and no farther than a maximum distance from the shoreline). The trip plan may be created to ensure that the marine vessel remains at least a minimum distance from the shoreline to avoid or reduce the likelihood of collisions with other marine vessels, marine life, submerged obstructions, heavy marine vessel traffic, etc.; that the marine vessel remain no farther than the maximum distance from the shoreline due to legal, regulatory, or contractual restrictions requiring the marine vessel to remain within waters associated with a particular government or entity; and/or that the marine vessel remain within a designated waterway or shipping lane (defined as being located between a minimum distance and a maximum distance from the shoreline or another location).

The vehicle(s) may include marine vessels, such as ships, boats, hovercraft, submarines, or the like. A trip plan can be created for a marine vessel to establish a planned movement trajectory that includes a planned course (e.g., path of movement), planned speeds at which the marine vessel is to move along the planned course, and/or a scheduled arrival time at one or more locations. The trip plan can be created based on expected (e.g., designated) ambient conditions. These expected ambient conditions can be forecasted, assumed, or default conditions. The expected ambient conditions can include a weather condition (e.g., temperature, precipitation, wind direction and/or speed, etc.), a water wave condition (e.g., wave direction, wave height, wave speed, etc.), a water current condition (e.g., current direction, current speed, etc.), a water swell condition (e.g., a swell direction, height, speed, etc.), a water temperature condition (e.g., the presence of an ice floe, a direction of movement of an ice floe, a speed at which an ice floe moves, the presence of ice sheets, etc.), or the like. During movement of a marine vessel according to the operational settings of the trip plan that are created based on the expected ambient conditions, the marine vessel may move off the trajectory of the trip plan. For example, the marine vessel may operate according to the operational settings but may not move on the planned course and/or may move slower or faster than the planned speeds. This deviation from the trip plan may be a result of the ambient conditions experienced by the marine vessel being different from the expected ambient conditions on which the trip plan is at least partially based. The system can examine the deviation of the movement of the marine vessel from the planned trajectory of the trip plan and determine modifications to the remaining operational settings of the trip plan that will bring the marine vessel back on the course of the original trip plan. Optionally, the system can examine the deviation of the movement of the marine vessel from the planned trajectory to determine a new trip plan. The modified or new trip plan can dictate operational settings that cause the marine vessel to arrive at the same location as the previous trip plan at the same time or within a designated extension of that time.

Optionally, movement of the vehicle is controlled based on preset or designated information as well as sensor readings without creating a trip plan for all or even part of a trip. For example, the systems described herein can determine operational settings to control movement of a vehicle system based on designated ambient conditions that are expected or forecast to occur, based on designated grades and/or curvatures, etc. During movement, sensors can obtain measurements of the same or other ambient conditions, grades, curvatures, or the like. The movement of the vehicle system can be modified or otherwise controlled based on both the designated and measured conditions. For example, a marine vessel can move along a trajectory that is determined based on a designated path and/or speed of water current. During movement, wind speed sensors can measure wind speed and/or direction, and the movement of the marine vessel can be controlled based on both the designated current direction and/or speed, as well as the measured wind direction and/or speed, to cause the marine vessel to travel along the trajectory or otherwise travel toward a location.

FIG. 1 illustrates one example of a vehicle system 100 and a communication system 104. The vehicle system may be formed from a single vehicle 102, or two or more vehicles traveling together along a route. The vehicles may or may not be mechanically coupled with each other. The vehicles may be propulsion-generating vehicles (e.g., locomotives, automobiles, trucks, other freight or passenger rail vehicles, rail-based ore carts or other mining equipment, marine vessels, or the like) and/or non-propulsion-generating vehicles (e.g., rail cars, trailers, barges, mining baskets, etc). The illustrated vehicle system represents a rail vehicle system, such as a train. But, the vehicles may be other off-highway vehicles (e.g., electric mine haul trucks or heavy construction equipment), marine vessels, and/or other vehicles generally. The vehicle system travels along a route, which can represent a track, road, waterway, or the like.

The communication system may include several devices (also referred to as components), that may communicate with each other and/or among each other according to one embodiment. For example, the devices may include a power unit 120, communications unit 116, an energy management system 118, or the like. The power unit may provide electrical power to the vehicle system. Additionally or alternatively, the power unit may power the communications system. For example, the power unit may be a battery and/or circuitry that supplies electric current to power other components. The communications unit may enable communication between the vehicle system and the communications system using transceiver circuitry, and hardware such as a wireless antenna. The energy management system may perform a number of functions for the communication system. For example, the energy management system may determine an estimated trip load, determine an amount of available energy of the power unit, transmit a request signal via the communications unit to the vehicle system, or the like.

The communication system communicates data between various devices that may be onboard and/or off-board the vehicle system. The communication system can receive data signals (e.g., wireless data signals) from off-board wayside devices, such as roadside transponders, signals, sensor systems (e.g., hotbox detectors), positive train control transponders, buoys, other vehicles, etc. The off-board communication system may receive data signals from other off-board devices, such as satellites, wireless devices (e.g., cellular phones, computers, remote controls, etc.), a dispatch tower, or other locations.

The devices shown onboard vehicle may be disposed onboard a single vehicle of the vehicle system or optionally may be distributed among two or more vehicles of the vehicle system. Different devices onboard the vehicle may communicate control signals (or other signals) with and/or among each other to control operations of the vehicle system. For example, devices onboard the vehicle system may communicate control signals (or other signals) with each other to control tractive or propulsive efforts produced by the vehicle system. Additionally or alternatively, the devices onboard the vehicle system may communicate control signals (or other signals) with each other to control braking or slowing efforts produced by the vehicle system. Additionally or alternatively, the devices may communicate control signals (or other signals) with each other to coordinate operations performed by the same type and/or different types of devices onboard the same and/or different vehicles in the vehicle system. Additionally or alternatively, the devices onboard the vehicle system may also communicate control signals (or other signals) with each other to display information from one or more components onboard one vehicle on a display device on the same or different vehicles, etc.

An energy management system 106 ("EMS") is a device onboard the vehicle system. Alternatively, the EMS may be off-board the vehicle system. The EMS may determine a trip plan to be used in controlling movement of vehicle system. The trip plan may also be communicated from the off-board communication system, on-board from the vehicle system, off-board dispatch centers, other communication locations, or the like. The trip plan includes designated operational settings of the vehicle system to dictate how the vehicle system is to travel along the route based on the designated grades of the route. Optionally, the trip plan can be created based on expected or designated ambient conditions. The designated operational settings may include designated power settings, acceleration settings, designated speeds, velocity settings, throttle settings, brake settings, rudder positions or angles, thrust, or the like, that control the vehicle system as the vehicle system travels along the route. The operational settings of the trip plan may be designated as a function of time, distance, and/or location of the route. Benefits of the vehicle system traveling according to the designated operational settings of the trip plan include reduced fuel consumption, reduced emissions generation by the vehicle system, improved handling of the vehicle system, the vehicle system arriving at a designated location within a designated time period and/or at a designated time, control of vehicle speed settings according to speed limits, or the like, relative to the same vehicle system traveling along the same route for the same trip according to different operational settings (e.g., traveling at the track speed or other speed limit of the route). The trip plan can define a trajectory of the vehicle system, such as a path that the vehicle system is to travel along and/or speeds at which the vehicle system is to travel along the path.

The designated operational settings of the trip plan may include designated power settings, designated speeds, designated rudder positions, designated headings (of movement), designated power output, or the like. The designated power settings of the vehicle system and the designated speeds of the vehicle system can be directly related as a function of acceleration (designated power settings) and velocity (designated speed settings) according to the designated grades of the route and/or ambient conditions in which the vehicle system is expecting or planned to travel. The designated grades of the route include expected grade increases (e.g., hills, etc.) and/or decreases (e.g., valleys, etc.) that the vehicle system will travel.

The designated power settings of the trip plan dictate how the vehicle power settings (e.g., throttle settings for acceleration of the vehicle system) are to be set at a given location along the route based on the designated grade of the route. For example, at a first location along the route, the designated grade may be expected to increase (e.g., the vehicle is expecting to travel up a hill). The vehicle system increases the designated power settings (e.g., the throttle settings increase) to continue traveling at the designated speed along the route according to the expected increasing designated grade of the route. Furthermore, at a second location along the route, the designated grade may be expected to decrease (e.g., the vehicle is expecting to travel down a hill). The vehicle system decreases the designated power settings (e.g., the throttle settings decrease) to continue traveling at the designated speed along the route according to the expected decreasing designated grade of the route.

The designated power settings of the trip plan optionally can be based on the expected ambient conditions. For example, over a first segment of the route, the expected ambient conditions may include a tail wind (e.g., a wind in the direction of travel), large wave heights, and swell directions in the direction of travel. Over a subsequent second segment of the route, the expected ambient conditions can include a wind that is oriented toward the port of the marine vessel, smaller wave heights, and deeper water (relative to the first segment of the route). The trip plan can include designated operational settings that provide a smaller power output of the engine of the marine vessel (relative to the second segment) and that direct a rudder angle of the marine vessel during travel through the first segment. The trip plan can include different operational settings during travel in the second segment, such as greater power outputs (to counteract the expected wind that is no longer a tailwind and/or a different rudder angle (to counteract the wind hitting the marine vessel at an angle to the planned trajectory) than the first segment. Optionally, the trip plan can be created (and/or modified) to ensure that the marine vessel travels only in waters having at least a designated depth over or through certain or designated portions of a planned course or path through the water.

A control system 110 (also referred to herein as a vehicle controller) controls operations of the vehicle and/or vehicle system. The control system represents hardware circuitry that includes and/or is connected with one or more processors (e.g., microprocessors, controllers, field programmable gate arrays, integrated circuits, etc.). The control system can generate signals that are communicated to a propulsion system 112 of the vehicle (e.g., motors, alternators, generators, engines, propellers, etc.), or to any other systems. The control system can include one or more input and/or output devices such as keyboard, an electronic mouse, stylus, microphone, touchscreen, other display screen, or the like, for communicating with an operator of the vehicle or vehicle system. The control system is operably connected with components of the off-board communication system. Additionally or alternatively, the control system is operably connected with components that are disposed onboard the vehicle, onboard other vehicles of the vehicle system, and/or off-board the vehicle system to control operation of the vehicle system. For example, the control system may receive instructions from the EMS that dictate how the vehicle system is to move at different locations during a trip.

Additionally or alternatively, the off-board communication system may communicate designated operational settings of a trip plan to the energy management system onboard the vehicle, onboard other vehicles of the vehicle system, and/or off-board the vehicle system. Optionally, the communication system, or other communication source, may provide information to the energy management system that is used by the EMS to create the trip plan. Based on the communicated designated operational settings of the trip plan, the energy management system can determine throttle settings, brake settings, or the like, of the vehicle or vehicle system as a function of time and/or distance along the route in order to cause the vehicle system to arrive at a designated location along the route within a designated time period and/or at a designated time. The energy management system may communicate throttle settings and/or brake settings, or the like, to the control system. The control system generates signals, based on the communication from the EMS, that are communicated to the propulsion system of the vehicle. The generated signals control operations of the vehicle system and/or direct an operation of the vehicle system in order to control movement according to the trip plan.

For example, the off-board communication system may communicate designated operational settings of the trip plan, including designated power settings, designated speeds, rudder positions, etc., along the route to the energy management system of the vehicle. These designated settings of the trip plan can be determined based on the designated grades of the route and/or expected ambient conditions. Changes of the designated grade along the route may be positive grade changes (e.g., incline, increasing grade, etc.) or may be negative grade changes (e.g., decline, decreasing grade, etc.). For example, the designated grade along the route may include an incline of route along a distance X. The designated power setting would increase along the distance X due to the grade increase, resulting in increased designated speed along the distance X. Alternatively, the designated grade along the route may include a decline of the route along a distance Y. The designated power setting would decrease along the distance Y due to the grade decrease, resulting in decreased designated speed along the distance Y.

Figure 2:
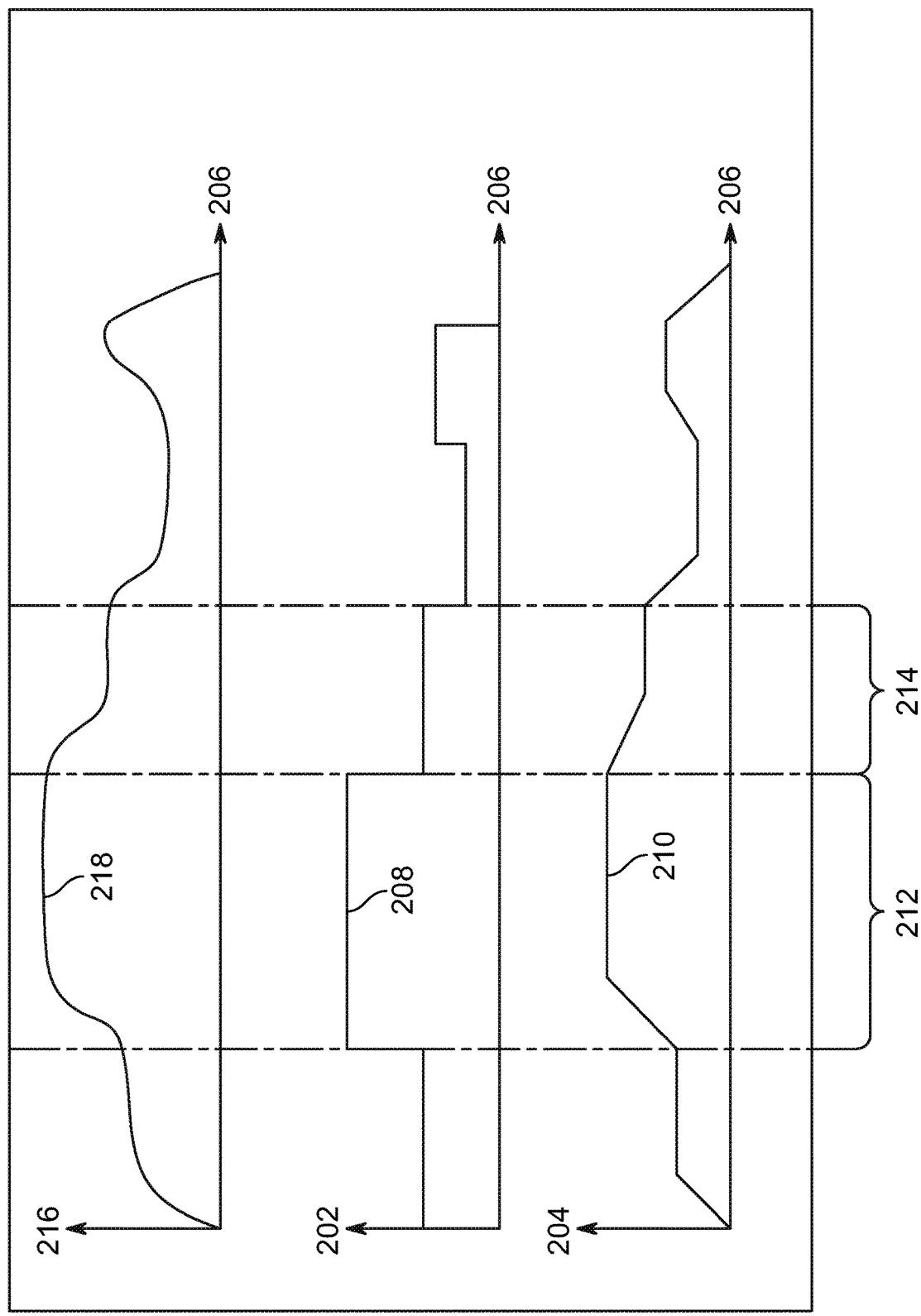
FIG. 2 is a schematic illustration of one example of designated operational settings of a vehicle system.

FIG. 2 illustrates an example of how the designated power settings 208, designated speeds 210, and designated grades 218 interact along route of the trip plan. The trip plan, as communicated by the off-board communication system to the energy management system, includes designated operational settings of the vehicle along the route. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218.

For example, a first segment A 212 of the trip illustrates the relationship between the designated power setting 208 of the trip plan, the designated speed 210 of the trip plan, and the designated grade 218 of the trip plan along the first segment A 212 of the trip plan. Along the first segment A 212, the designated speed 210 increases in order to accommodate the increasing designated grade 218 of the route. For example, a train travels along a route. Along the route at a given location the train needs to travel up a hill (e.g., an increasing grade) of the route. In order for the train to continue traveling at the same speed along the increasing grade, the train adjusts the operational settings by increasing the speed setting. Along the same first segment A 212, in order for the vehicle to meet the increasing designated speed 210 due to the increasing designated grade 218, the designated power setting 208 also increases. For example, as the same train travels along the route, and at the given location the train travels up a hill (e.g., an increasing grade) of the route. In order for the train to continue traveling at the same speed along the increasing grade, the train adjusts the operational settings by increasing the throttle setting. The increase to the throttle setting (e.g., power setting) increases the speed of the train, thus demonstrating the relationship between the power setting and the speed setting of the train.

As another example, a second segment B 214 of FIG. 2 illustrates the relationship between the designated power setting 208 of the trip plan, the designated speed 210 of the trip plan, and the designated grade 218 of the trip plan along the second segment B 214 of the trip plan. Along the second segment B 214, the designated speed 210 decreases in order to accommodate the decreasing designated grade 218 of the route. For example, a train travels along a route. Along the route at a given location the train travels down a hill (e.g., a decreasing grade) of the route. In order for the train to continue traveling at the same speed along the decreasing grade, the train adjusts the operational settings by decreasing the speed setting. Along the same second segment B 214, in order for the vehicle to meet the decreasing designated speed 210 due to the decreasing designated grade 218, the designated power setting 208 also decrease. For example, as the same train travels along the route, and at the given location the train travels down a hill (e.g., a decreasing grade) of the route. In order for the train to continue traveling at the same speed along the decreasing grade, the train adjusts the operational settings by decreasing the throttle setting. The decrease to the throttle setting (e.g., power setting) decreases the speed of the train, thus demonstrating the relationship between the power setting and the speed setting of the train.

However, the trip plan may be based on designated grades of the route that includes one or more grade errors between the designated grades of the route and the actual grades of the route. There may be discrepancies in the designated grade of the route based on the differences between the designated power settings of the trip plan and the vehicle-controlled power settings. For example, a train travels along a route at a given location. At the given location of the route, the train is expecting to travel up a hill, or increasing grade. However, the actual increasing grade of the route might differ from the designated increasing grade of the route. For example, the actual increasing grade of the route might have an incline of 20 degrees, but the designated grade of the route might expect an incline of 35 degrees. The difference between the actual incline (20 degrees) and the designated incline (35 degrees) of the route is a grade error. The grade error could be a positive grade error or a negative grade error (described further below). The grade error between the designated grade and the actual grade of the route could be attributed to several factors including but not limited to miscalculated grades, environmental conditions (also referred to herein as ambient conditions), adhesion between one or more wheels of the vehicle and the route, vehicle cargo, damage to the route or vehicle system, etc.

FIGS. 3 through 6 provide different examples of how the energy management system of the vehicle system can modify the trip plan so that the vehicle can travel at designated speeds and designated power settings. For example, as the vehicle travels, the energy management system may identify that the vehicle may not be operating at the designated power setting of the trip plan resulting in the vehicle not traveling at the designated speed of the trip plan. In response, the energy management system can modify the trip plan as described below.

Figure 3:
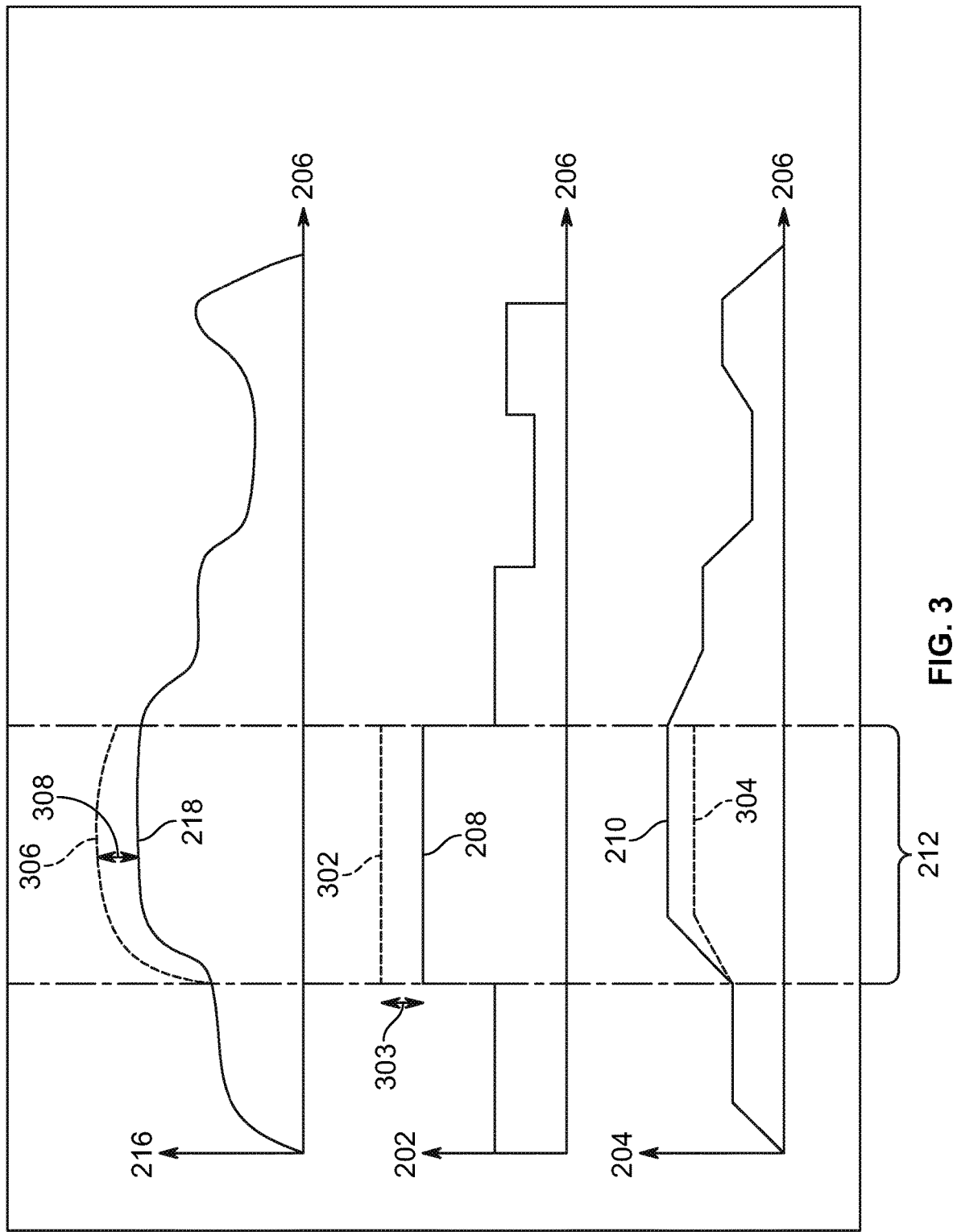
FIG. 3 is a schematic illustration of one example of operational setting differences.

FIG. 3 illustrates an example of a positive grade error 308 for a vehicle traveling along a route according to a trip plan along an increasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218. Demonstrated in FIG. 3 is one example of the energy management system of the vehicle identifying a positive grade error 308 between the designated grade 218 of the trip plan, and an actual grade 306 of the route along the first segment A 212. The positive grade error 308 along first segment A 212 results in a difference between the designated power settings 208 and vehicle-controlled power settings 302, as well as a difference between the designated speed 210 and an actual speed 304 of the vehicle. For example, along the first segment A 212, the vehicle travels along an increasing grade. Along this increasing grade, however, there is the positive grade error 308 between the designated grade 218 and the actual grade 306. This positive grade error 308 results in the designated power settings too low for the vehicle to travel at the designated speeds 210. For example, a train travels along a route. At a given location along the route, the train expects to travel up a hill (e.g., an increasing grade) at a degree of incline of 25 degrees from the horizontal. However, as the train travels up the hill, it is determined that the actual degree of incline is 40 degrees from the horizontal, resulting in a positive grade error of 15 degrees between the designated grade and the actual grade of the route (e.g., the actual up hill is steeper than expected). Because of this positive grade error, the train is not able to travel at the designated speed of 75 mph at this location along the route, resulting in the train traveling at an actual speed of 60 mph that is slower than the designated speed setting of the trip plan.

The energy management system may identify this power setting difference 303 between the designated power settings 208 and the vehicle-controlled power settings 302. The energy management system may increase the vehicle-controlled power settings 302 of the vehicle by an amount of correction value identified by the power setting difference 303 to make up for the positive grade error 308 of the route at the grade error location. The increase to the vehicle-controlled power setting 302 results in the increase to the actual speed 304 of the vehicle, causing the vehicle to move towards the designated speeds 210 of the trip plan. For example, the train identifies that there is the positive grade error between the designated grade and the actual grade of the route. The train travels up a hill that has a greater increasing grade (e.g., the actual up hill is steeper than expected). Additionally, the train must also maintain the designated speed setting of 75 mph according to the trip plan. In order to keep the train traveling at the designated speed setting, the train increases the throttle settings by 25% (e.g., the vehicle-controlled power settings) in order for the train to increase the actual speed to 75 mph to reach the top of the hill while traveling at the designated speed setting.

Figure 4:
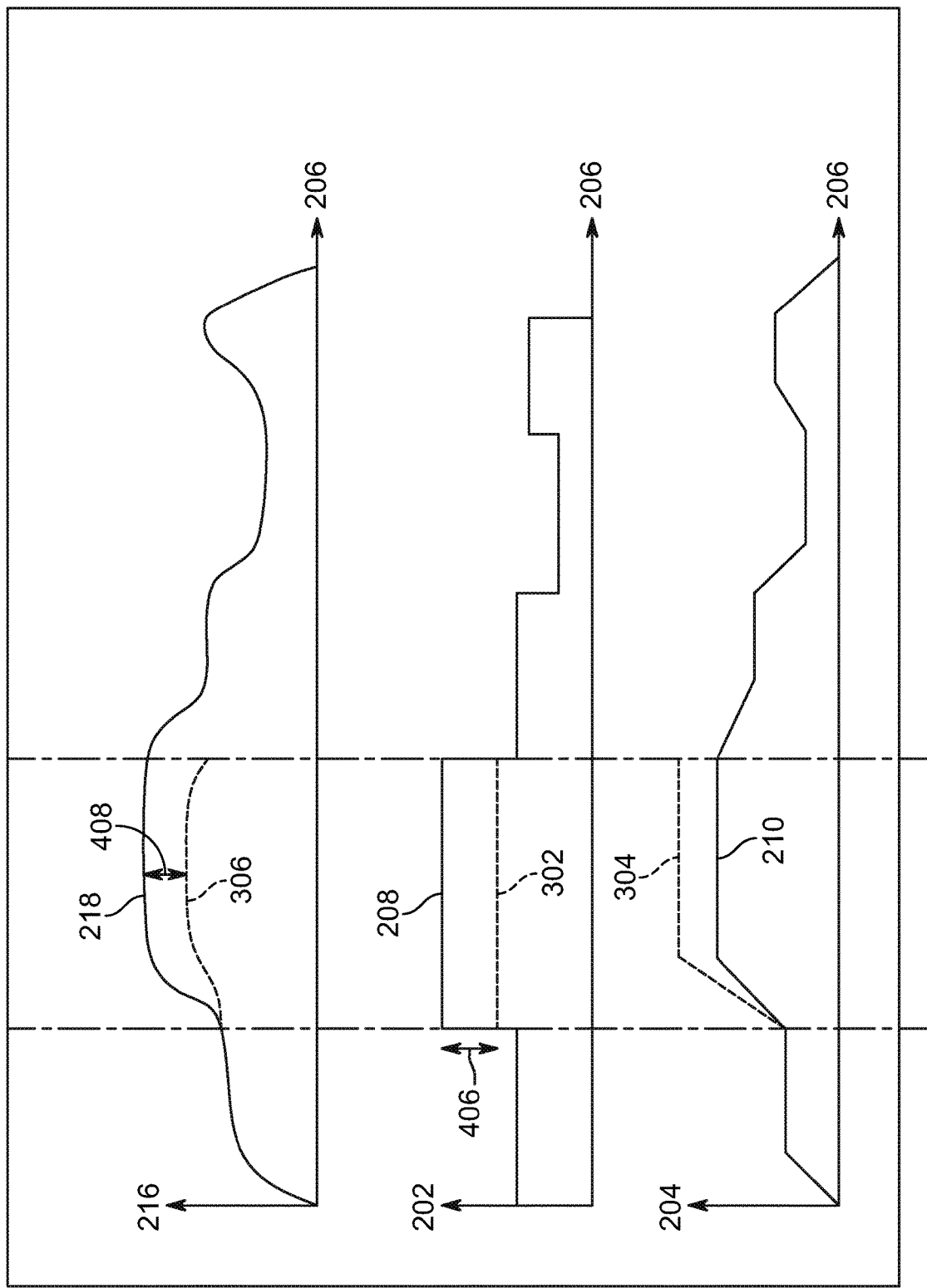
FIG. 4 is another schematic illustration of operational setting differences.

FIG. 4 illustrates an example of a negative grade error 408 for the vehicle traveling along the route according to a trip plan along an increasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218 of the trip plan. Demonstrated in FIG. 4 is one example of the energy management system of the vehicle identifying a negative grade error 408 between the designated grade 218 of the trip plan, and the actual grade 306 of the route along the distance A 212. The negative grade error 408 along the first segment A 212 results in a difference between the designated power settings 208 and the vehicle-controlled power settings 302, as well as a difference between the designated speed 210 and the actual speed 304 of the vehicle. For example, along the first segment A 212, the vehicle travels along an increasing grade. Along this increasing grade, however, there is the negative grade error 408 between the designated grade 218 and the actual grade 306. This negative grade error 408 results in the designated power settings 208 too high for the vehicle to travel at the designated speeds 210. For example, a train travels along a route. At a given location along the route, the train expects to travel up a hill (e.g., an increasing grade) at a degree of incline of 40 degrees from the horizontal. However, as the train travels up the hill, it is determined that the actual degree of incline is 25 degrees from the horizontal, resulting in a negative grade error of −15 degrees between the designated grade and the actual grade of the route (e.g., the actual up hill is less steep than expected). Because of this negative grade error, the train is not able to travel at the designated speed of 75 mph at the location along the route, resulting in the train traveling at an actual speed of 90 mph that is faster than the designated speed setting of the trip plan.

The energy management system may identify this power setting difference 406 between the designated power settings 208 and the vehicle-controlled power settings 302. The energy management system may decrease the vehicle-controlled power settings 302 of the vehicle by an amount of correction value identified by the power setting difference 406 to make up for the negative grade error 408 of the route at the grade error location. The decrease to the vehicle-controlled power setting 302 results in the decrease to the actual speed 304 of the vehicle, causing the vehicle to move towards the designated speeds 210 of the trip plan. For example, the train identifies that there is the negative grade error between the designated grade and the actual grade of the route. The train travels up a hill that has a lesser increasing grade (e.g., the actual up hill is less steep than expected). Additionally, the train must also maintain the designated speed setting of 75 mph according to the trip plan. In order to keep the train traveling at the designated speed setting, the train decreases the throttle settings by 20% (e.g., the vehicle-controlled power settings) in order for the train to decrease the actual speed to 75 mph to reach the top of the hill while traveling at the designated speed setting.

Figure 5:
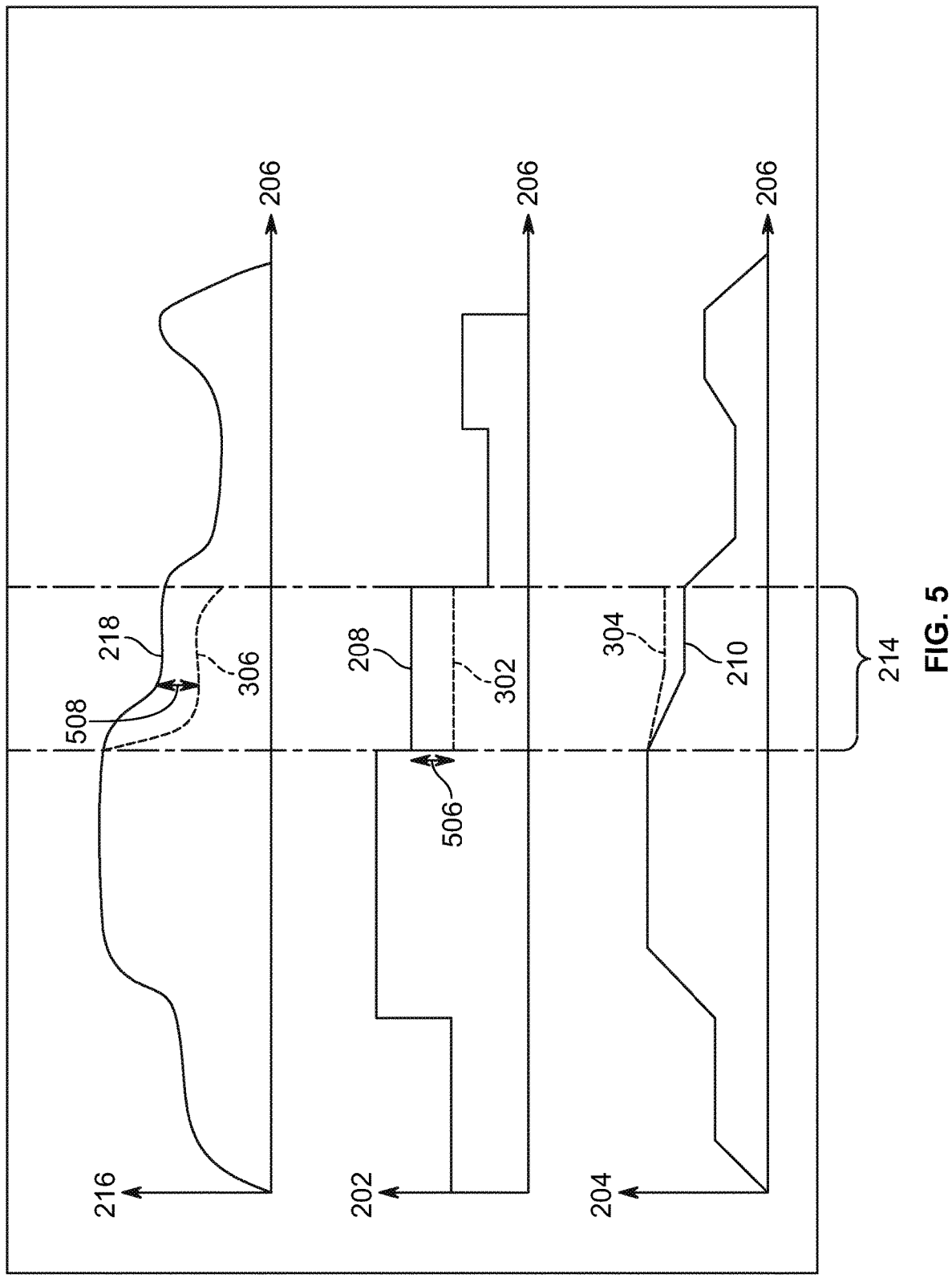
FIG. 5 is another schematic illustration of operational setting differences.

FIG. 5 illustrates an example of a negative grade error 508 for a vehicle traveling along a route according to a trip plan along a decreasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218 of the trip plan. Demonstrated in FIG. 5 is one example of the energy management system of the vehicle identifying a negative grade error 508 between the designated grade 218 of the trip plan, and the actual grade 306 of the route along the second segment B 214. The negative grade error 508 along the second segment B 214 results in a difference between the designated power settings 208 and the vehicle-controlled power settings 302, as well as a difference between the designated speed 210 and the actual speed 304 of the vehicle. For example, along the second segment B 214, the vehicle travels along a decreasing grade. Along this decreasing grade, however, there is the negative grade error 508 between the designated grade 218 and the actual grade 306 of the route. This negative grade error 508 results in the designated power settings 208 too high for the vehicle to travel at the designated speeds 210. For example, a train travels along a route. At a given location along the route, the train expects to travel down a hill (e.g., a decreasing grade) at a degree of decline of −25 degrees from the horizontal. However, as the train travels down the hill, it is determined that the actual degree of decline is −40 degrees from the horizontal, resulting in a negative grade error of −15 degrees between the designated grade and the actual grade of the route (e.g., the actual downhill is steeper than expected). Because of this negative grade error, the train is not able to travel at the designated speed of 75 mph at the location along the route, resulting in the train traveling at an actual speed of 90 mph that is faster than the designated speed setting of the trip plan.

The energy management system may identify this power setting difference 506 between the designated power settings 208 and the vehicle-controlled power settings 302. The energy management system may decrease the vehicle-controlled power settings 302 of the vehicle by an amount of correction value identified by the power setting difference 506 to make up for the negative grade error 508 of the route at the grade error location. The decrease to the vehicle-controlled power setting 302 results in the decrease to the actual speed 304 of the vehicle, causing the vehicle to move towards the designated speeds 210 of the trip plan. For example, the train identifies that there is the negative grade error between the designated grade and the actual grade of the route. The train travels down a hill that has a greater decreasing grade (e.g., the actual downhill is steeper than expected). Additionally, the train must also maintain the designated speed setting of 75 mph of the trip plan. In order to keep the train traveling at the designated speed setting, the train decreases the throttle settings by 20% (e.g., the vehicle-controlled power settings) in order for the train to decrease the actual speed setting to reach the bottom of the hill while traveling at the designated speed setting.

Figure 6:
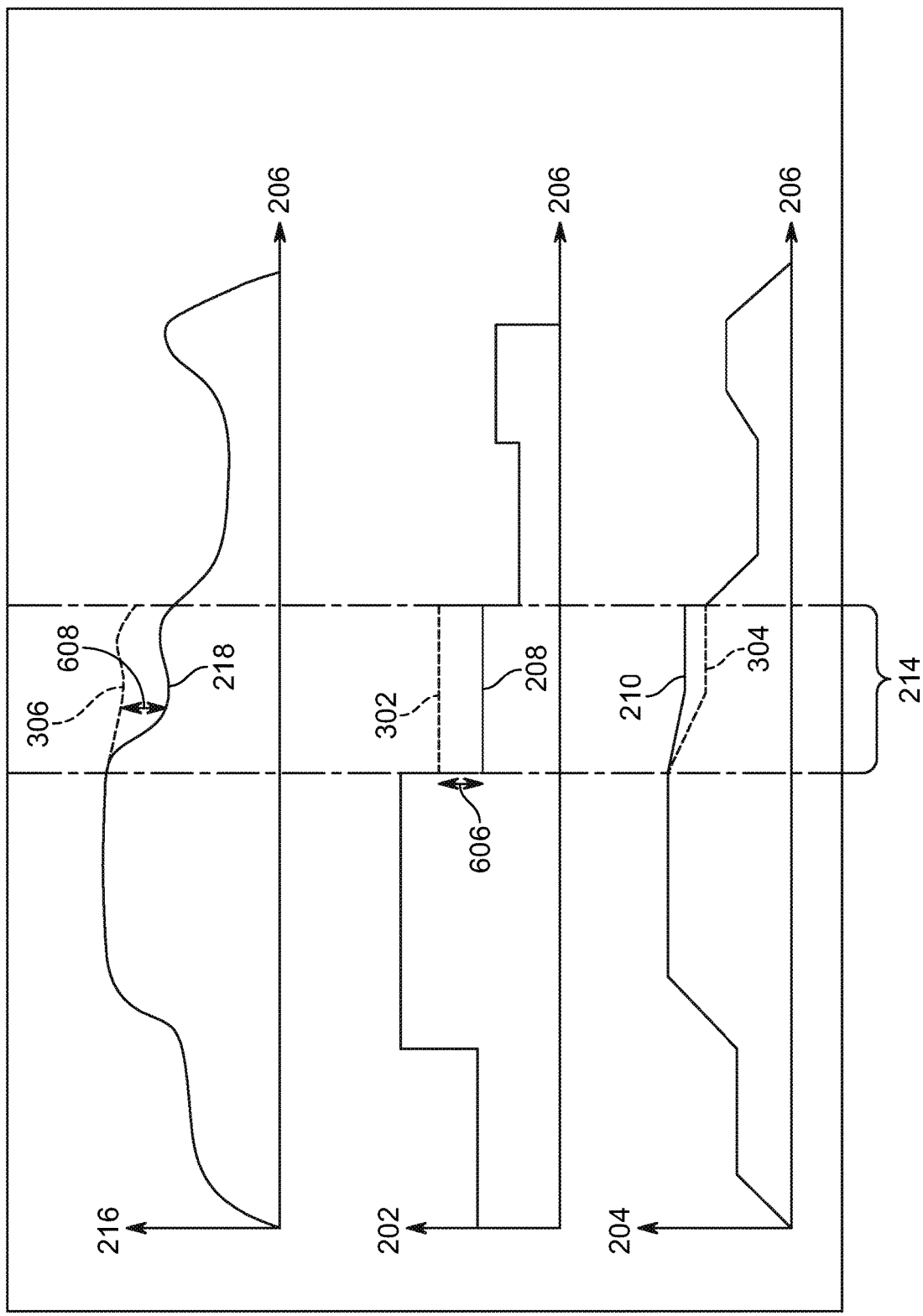
FIG. 6 is another schematic illustration of operational setting differences.

FIG. 6 illustrates an example of a positive grade error 608 for a vehicle traveling along a route according to a trip plan along a decreasing designated grade. Illustrated as a function of power settings 202 versus distance 206 is the designated power setting 208 of the trip plan. Illustrated as a function of speed 204 versus distance 206 is the designated speed 210 of the trip plan. Illustrated as a function of grade elevation 216 versus distance 206 is the designated grade 218 of the trip plan. Demonstrated in FIG. 6 is one example of the energy management system of the vehicle identifying a positive grade error 608 between the designated grade 218 of the trip plan, and the actual grade 306 of the route along the second segment B 214. The positive grade error 608 along the second segment B 214 results in a difference between the designated power settings 208 and the vehicle-controlled power settings 302, as well as a difference between the designated speed 210 and the actual speed 304 of the vehicle. For example, along the second segment B 214, the vehicle travels along a decreasing grade. Along this decreasing grade, however, there is the positive grade error 608 between the designated grade 218 and the actual grade 306 of the route. This positive grade error 608 results in the designated power settings 208 too low for the vehicle to travel at the designated speeds 210. For example, a train travels along a route. At a given location along the route, the train expects to travel down a hill (e.g., a decreasing grade) at a degree of decline of −40 degrees from the horizontal. However, as the train travels down the hill, it is determined that the actual degree of decline is −25 degrees from the horizontal, resulting in a positive grade error of 15 degrees between the designated grade and the actual grade of the route (e.g., the actual downhill is less steep than expected). Because of this positive grade error, the train is not able to travel at the designated speed of 75 mph at the location along the route, resulting in the train traveling at an actual speed of 60 mph that is slower than the designated speed setting of the trip plan.

The energy management system may identify this power setting difference 606 between the designated power settings 208 and the vehicle-controlled power settings 302. The energy management system may increase the vehicle-controlled power settings 302 of the vehicle by an amount of correction value identified by the power setting difference 606 to make up for the positive grade error 608 of the route at the grade error location. The increase to the vehicle-controlled power setting 302 results in the increase to the actual speed 304 of the vehicle, causing the vehicle to move towards the designated speeds 210 of the trip plan. For example, the train identifies that there is the positive grade error between the designated grade and the actual grade of the route. The train travels down a hill that has a lesser decreasing grade (e.g., the actual downhill is less steep than expected). Additionally, the train must also maintain the designated speed setting of 75 mph of the trip plan. In order to keep the train traveling at the designated speed setting, the train increases the throttle settings by 25% (e.g., the vehicle-controlled power settings) in order for the train to increase the actual speed setting to reach the bottom of the hill while traveling at the designated speed setting.

Alternatively or additionally, the power setting differences 303, 406, 506, and 606 along a route between the designated power settings of the trip plan and the vehicle-controlled power settings can also be caused by factors other than or in addition to grade errors along the route. For instance, power settings differences could be caused by environmental factors. As the vehicle travels along the route according to the designated operational settings of the trip plan, the designated operational settings of the trip plan may be predetermined to assume no environmental factors will impact the route of the vehicle. However, if the vehicle is subjected to environmental factors such as rain, ice, wind, or the like, the vehicle might travel at actual speeds and vehicle-controlled power settings that differ from the trip plan designated speeds and designated power settings. If the vehicle travels the route subjected to one or more environmental facts (e.g., rain, ice, wind, etc.), the vehicle might not travel at the designated speeds of the trip plan. Therefore, the energy management system increases or decreases the vehicle-controlled power settings in order to cause the vehicle to move towards the designated speeds of the trip plan. Thus, the difference between the designated power settings and the vehicle controlled power settings might result in a power setting difference caused by environmental factors. For example, a train travels along a route. While in transit, the train is subjected to an ice storm. The ice storm and high winds from the storm slows the speed of the train, resulting in the train traveling at a speed that is less than the designated speed setting of the trip plan. In order to overcome the slower speed of the vehicle due to the impact of the weather, and to get the train to travel at the designated speed settings, the train increases the vehicle-controlled power settings. By increasing the vehicle-controlled power settings, the actual speed of the train increases. The increase of the actual speed of the train increases in order to match the designated speed setting of the trip plan.

Alternatively or additionally, the power setting differences 303, 406, 506, and 606 along a route between the designated power settings and the vehicle-controlled power settings can also be caused by adhesion between one or more wheels of the vehicle and the route. As the vehicle travels along the route according to the designated operational settings of the trip plan, the designated operational settings of the trip plan may be predetermined to assume no adhesion between one or more wheels of the vehicle and the route will impact the route of the vehicle. However, if the vehicle is subjected to adhesion between one or more wheels of the vehicle system and the route, the vehicle might travel at actual speeds and vehicle-controlled power settings that differ from the trip plan designated speeds and designated power settings. If the vehicle travels the route subjected to one or more instances of adhesion between one or more wheels of the vehicle and the route, the vehicle might not be able to travel at the designated speeds of the trip plan. Therefore, the energy management system increases or decreases the vehicle-controlled power settings in order to cause the vehicle to move towards the designated speeds of the trip plan. Thus, the difference between the designated power settings and the vehicle controlled power settings might result in a power setting difference caused by an amount of adhesion between one or more wheels of the vehicle and the route. For example, a train travels along a route. While in transit, four wheels of the vehicle are subjected to unexpected amounts of adhesion between the wheels and a track of the route. This unexpected adhesion slows the speed of the train, making the train travel at an actual speed that is less than the designated speed setting of the trip plan. In order to overcome the slower speed due to the unexpected adhesion between the wheels and the track, and to get the train to travel at the designated speed settings, the train increases the vehicle-controlled power settings. By increasing the vehicle-controlled power settings, the actual speed of the train increases in order to match the designated speed setting of the trip plan.

Alternatively or additionally, the power setting differences 303, 406, 506, and 606 along a route between the designated power settings and the vehicle-controlled power settings can also be caused by differences between designated vehicle cargo and actual vehicle cargo. As the vehicle travels along the route according to the designated operational settings of the trip plan, the designated operational settings of the trip plan may be predetermined to assume the vehicle will be carrying a designated cargo. However, if the vehicle is carrying an actual cargo that differs from the designated cargo of the vehicle, the vehicle might travel at actual speeds and vehicle-controlled power settings that differ from the trip plan designated speeds and designated power settings. If the vehicle travels the route carrying a cargo that differs from the designated cargo, the vehicle might not be able to travel at the designated speeds. Therefore, the energy management system increases or decreases the vehicle-controlled power settings in order to cause the vehicle to move towards the designated speeds of the trip plan. Thus, the difference between the designated power settings and the vehicle controlled power settings might result in a power setting difference caused by differences between a designated cargo and actual vehicle cargo. For example, a train travels along a route. While in transit, the train is carrying a cargo load of 50 tons. However, the designated settings of the trip plan anticipated the train carrying a cargo load of tons. This unexpected cargo load difference results in the train traveling at an actual speed that is faster than the designated speed setting of the trip plan. In order to overcome the faster speed due to the cargo load difference, and to get the train to travel at the designated speed settings, the train decreases the vehicle-controlled power settings. By decreasing the vehicle-controlled power settings, the actual speed of the train reduces in order to match the designated speed setting of the trip plan.

The energy management system of the vehicle identifies the power setting differences 303, 406, 506, and 606 of FIGS. 3, 4, 5, and 6, respectively, and furthermore determines an anomaly count of the instances when the designated power settings are different than the vehicle-controlled power settings along the route. The anomaly count of the instances of power setting differences is identified when the power setting difference value exceeds a predetermined designated threshold margin value. For example, in FIG. 3, the energy management system increases the vehicle-controlled power settings 302 to make up for the positive grade error 308 between the designated grade 218 and the actual grade 306. If the power setting difference 303 exceeds the predetermined designated threshold margin, the error is recorded within the anomaly count. For example, a train travels along a route. At a location along the route, the train travels up a hill (e.g., an increasing grade). The actual grade of the hill is 45 degrees from the horizontal. However, the designated grade of the trip plan was expected to be 25 degrees from the horizontal. The difference between the actual grade of the route and the designated grade of the trip plan results in a 20 degree positive grade error. Because of this 20 degree positive grade error, the train travels at an actual speed of 60 mph, which is less than the designated speed setting of 75 mph of the trip plan. In order to keep the train traveling at the designated speed setting of 75 mph, the train increases the throttle settings by 25% (e.g., the vehicle-controlled power settings) in order to make the train increase the actual speed to 75 mph. The energy management system has a predetermined designated threshold margin of a 10% difference between the designated power settings of the trip plan, and the actual vehicle-controlled power settings of the train. The 25% throttle setting increase exceeds the predetermined 10% threshold power setting difference. Because the 25% increase exceeds the 10% threshold, this instance is recorded by the energy management system as an error, and is recorded as an anomaly count.

Furthermore, the energy management system communicates the anomaly count of the identified power setting differences, the identified positive grade errors and the identified negative grade errors to the off-board communication system. This responsive communication of the one or more differences between the designated trip plan operational settings and the actual vehicle-controlled settings allows for systematic scheduled inspections of the route at error locations. The responsive communication provides data to modify the trip plan as the vehicle is in transit in order to minimize the difference between the designated operational settings and the actual vehicle operational settings. Furthermore, the responsive communication provides data to update the trip plan for future vehicle systems traveling along the route.

The anomaly count of the power setting differences is additionally used to determine a route health index. The route health index is determined by reviewing the number of anomaly count instances of a route. The route health index is compared to a predetermined health index range in order to understand the extent of damage to the route. For example, a train travels along the route. During transit, the energy management system identifies an anomaly count of 36. The anomaly count identifies 36 instances of power settings differences and positive and/or negative grade errors at specific locations along the route. The predetermined health index range identifies a route having a good health for anomaly count values of 0 to 25, and a bad health for anomaly count values of greater than 25. The example anomaly count of 36 identifies the route to be in bad health.

Figure 7:
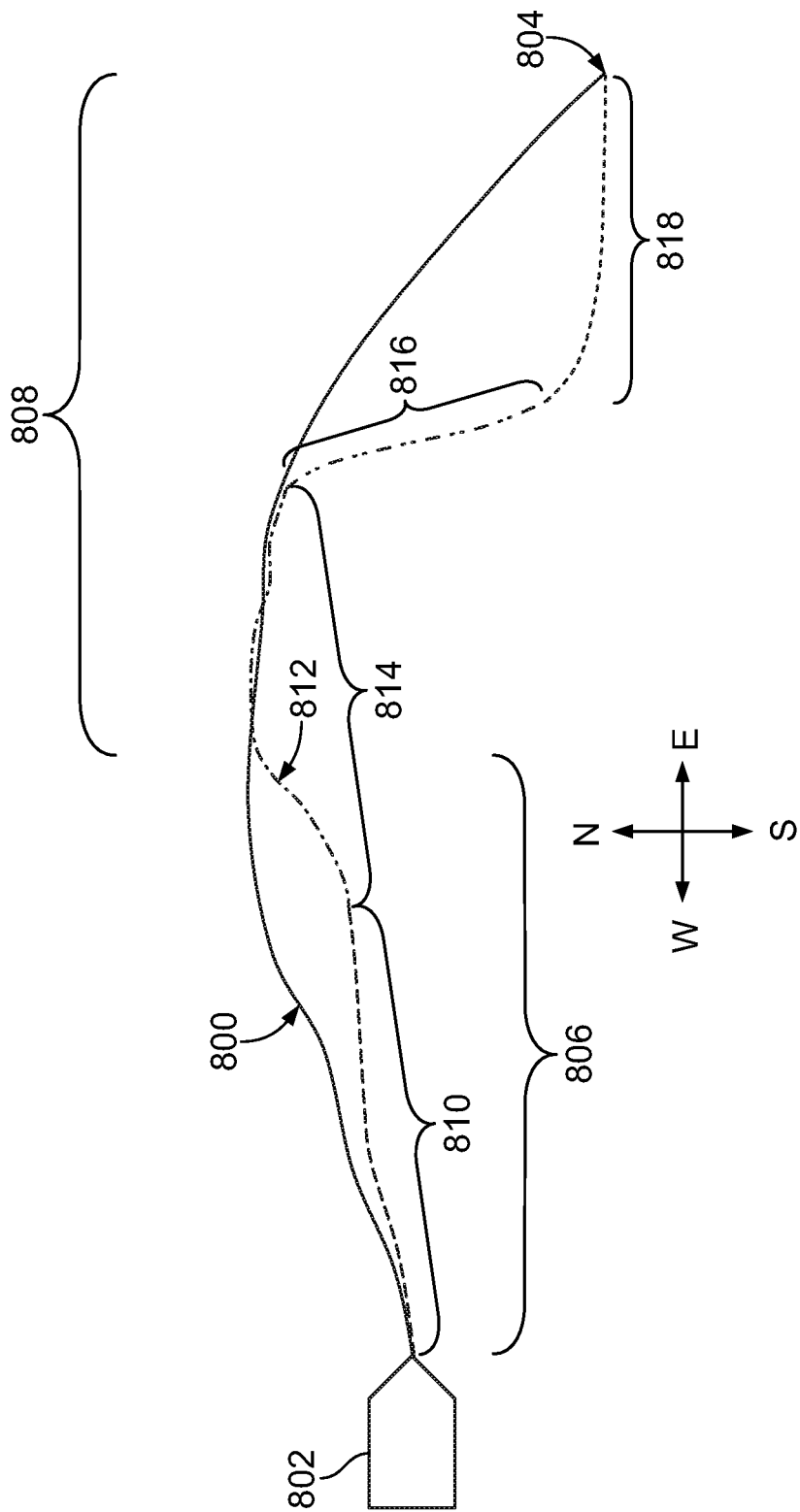
FIG. 7 illustrates one example of a trip plan for a marine vessel and modification of the trip plan based on differences between expected and experienced ambient conditions.

FIG. 7 illustrates one example of a trip plan 800 for a marine vessel 802 and modification of the trip plan based on differences between expected and experienced ambient conditions. The marine vessel shown in FIG. 7 may represent one or more of the vehicles shown and/or described herein. The trip plan shown in FIG. 7 represents a trajectory that the marine vessel is to travel along in water to a destination location 804 within a scheduled time. The trip plan can include operational settings that, if used, will cause the marine vessel to move along the trajectory and arrive at the location within the scheduled time. These operational settings can include power outputs or thrust generated by the propulsion system of the marine vessel, rudder positions, and the like.

The operational settings can be determined based on expected ambient conditions of the trip to the destination location. For example, during a first segment 806 of the trip, the predicted ambient conditions include wind along the north direction (N) and having a first speed, small waves in the north direction, and a swell in the east direction (E). During a second segment 808 of the trip, the expected ambient conditions include wind along the south direction (S) having a faster second speed, small waves in the south direction, and a swell in the south direction. The predicted conditions can be obtained from a third party source, from a local database (or other tangible and non-transitory computer-readable medium onboard or off-board the marine vessel), from operator input, or the like.

The EMS can determine the locations and/or headings of the marine vessel (e.g., by monitoring rudder positions or angles, global positioning system receiver outputs, dead reckoning system outputs, etc.) and the power outputs or thrusts generated by the marine vessel at different times and/or locations to cause the marine vessel to travel along the trajectory and arrive at the destination location at the scheduled time based on these expected ambient conditions. The marine vessel can operate and move using the operational settings dictated by the trip plan. But, because the ambient conditions experienced by the marine vessel may differ from the expected ambient conditions on which the trip plan is based, the movement of the marine vessel may deviate from the trajectory defined by the trip plan. In FIG. 7, for example, the wind in the first segment of the trip may not be as fast as the expected wind speed. As a result, a first portion 810 of a traveled path 812 of the marine vessel may deviate from the trajectory defined by the trip plan.

The EMS can modify the operational settings of the trip plan (or create a new trip plan) based on the experienced ambient conditions and/or updated or new expected ambient conditions. These new operational settings can be different headings and/or power outputs that cause the marine vessel to travel back toward the trajectory of the previous trip plan or along another trajectory toward the destination location. In the illustrated example, the EMS modifies the trip plan so that the marine vessel moves back toward the trajectory of the previous trip plan, as shown along a second portion 814 of the traveled path of the marine vessel.

But, the expected ambient conditions used to modify the trip plan also may differ from the ambient conditions experienced by the marine vessel. For example, the wind speed in the south direction may be faster than the expected wind speed in the south direction, the waves in the south direction may be taller than the expected wave heights, the current in the south direction may be moving faster than the expected current speed, or the like. This can cause a third portion 816 of the traveled path of the marine vessel to also deviate from the trajectory defined by the prior and/or current trip plan, as shown in FIG. 7. The EMS can again modify the operational settings of the trip plan based on the different ambient conditions (and/or based on updated ambient conditions), as well as the deviated location or heading of the marine vessel (from the trajectory of the prior trip plan), to cause the marine vessel to travel along a fourth portion 818 of the traveled path to the destination location. The trip plan can be repeatedly modified to account for deviations from the traveled path of the marine vessel (or location of the marine vessel) from the planned trajectory of the marine vessel. Alternatively, the trip plan can be repeatedly modified based on a location of the marine vessel relative to the destination location and based on the expected ambient conditions. The EMS can modify the trip plan as needed to move the marine vessel toward the destination location.

The EMS can modify the trip plan for a marine vessel in response to a variety of differences between expected and experienced ambient conditions. For example, the EMS can change a designated heading and/or power output of a trip plan responsive to an actual wind direction, wind speed, current or swell direction, and/or current or swell speed being different from an expected wind direction, wind speed, current or swell direction, and/or current or swell speed. The EMS can change a designated heading and/or power output of a trip plan responsive to ice being present in the water when the trip plan was created with the expectation of no ice in the water. Changing the heading and/or power output can allow for the marine vessel to travel around or through the ice, as needed, to travel toward the destination location. The ice can be ice floes, ice sheets, or the like, in the water.

Optionally, the EMS can correct or change the database or other memory that stores the predicted ambient conditions based on the differences identified during travel of the marine vessel. For example, if the EMS changes the trip plan to account for the current direction and/or speed being different from the predicted current direction and/or speed, then the EMS can change the database or memory (or communicate a signal notifying and/or requesting the change) to correct the predicted ambient condition(s).

The communication unit onboard the marine vessel can communicate with other marine vessels and/or other locations (e.g., a dispatch or scheduling facility, satellites, etc.) to monitor locations and/or trajectories of the other marine vessels. The EMS or control system can determine or modify the operational settings to ensure that the marine vessel does not interact with other marine vessels. For example, the operational settings can be determined to prevent the marine vessel from colliding with other marine vessels, to prevent waves or wake created by the marine vessel from interfering with or counteracting the movement of the other marine vessels, to prevent waves or wake created by the other marine vessels from interfering with or counteracting the movement or trajectory of the marine vessel, etc. This can also be performed to ensure that a shipping lane to be traveled by the marine vessel is not occupied by other marine vessels at the time that the marine vessel will be traveling in the shipping lane.

Figure 8:
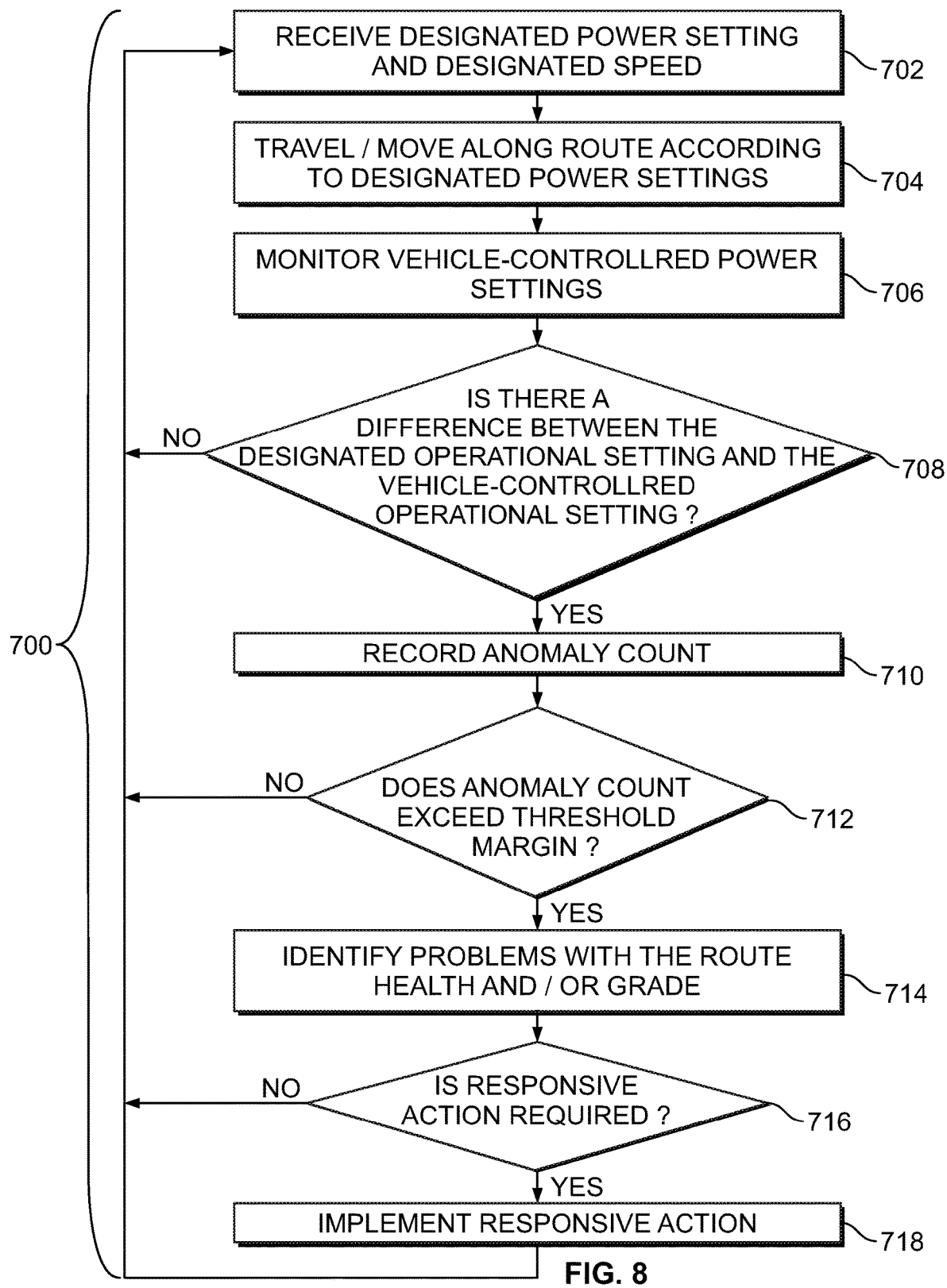
FIG. 8 illustrates a flowchart of one example of a method for identifying operational setting differences.

FIG. 8 illustrates a flowchart of one embodiment of a method 700 for identifying operational setting differences between the designated operational settings of the trip plan and the vehicle-controlled operational settings of the route. At 702, a data signal is received by the vehicle system. The signal may be sent from one or more devices off-board the vehicle system, or may be generated on-board the vehicle system. The signal includes designated operational settings at which the vehicle is to travel along a route according to a determined trip plan. The designated operational settings include designated power settings and designated speeds at which the vehicle should operate along a route according to a designated grade.

At 704, the vehicle travels or moves along the route for a rolling window predefined increment of distance (e.g., 2-miles, 5-miles, 10-miles, any other value of distance, etc.) according to the designated power settings of the trip plan. At 706, the energy management system monitors the designated operational settings in view of the how the vehicle actually travels along the route. The EMS monitors the vehicle-controlled operational settings, including vehicle-controlled power settings and actual speeds.

At 708, a determination is made to whether there is a difference between the designated operational settings of the trip plan and the actual vehicle operational settings. Specifically, such differences could be between the designated power settings and the vehicle-controlled power settings; between the designated speed and the actual speed at which the vehicle travels; between the designated grade of the route and the actual grade of the route; or the like. If it is determined no differences exist between the designated operational settings of the trip plan and the actual vehicle controlled operational settings along the predefined increment of distance (e.g., 2-miles, 5-miles, 10-miles, any other value of distance, etc.) along the route, flow of the method 700 proceeds towards 702. Alternatively, flow of the method 700 proceeds towards 710 if it is determined that a difference does exist between the designated operational settings of the trip plan and the actual vehicle controlled operational settings. At 710, the determined difference is recorded as an anomaly count. Flow of the method 700 then continues to 712.

At 712, a determination is made whether the anomaly count difference between the designated operational setting of the trip plan and the actual vehicle-controlled operation setting exceeds a predetermined threshold margin value. If the difference between the designated operational setting of the trip plan and the actual vehicle-controlled operation setting does not exceed the predetermined threshold margin value, flow of the method 700 proceeds towards 702. Alternatively, flow of the method 700 proceeds towards 714 if it is determined that the differences between the designated operation setting of the trip plan and the actual vehicle-controlled operation setting does exceed the predetermined threshold margin value.

At 714, identification of a problem of the route health and/or grade is made. The problem is identified by one or more differences between the designated operational settings of the trip plan and the actual vehicle-controlled operation settings along the predefined increment of distance of the route. Identified differences may be categorized as positive grade errors or negative grade errors. Alternatively or additionally, identified differences may be used to determine the route health index as detailed above. Alternatively or additionally, identified differences may be categorized as power setting differences between the designated power settings and the vehicle-controlled power settings. Alternatively or additionally, identified differences may be categorized as non-anticipated weather conditions (e.g., rain, wind, ice, etc.) that may prevent the vehicle from traveling/moving at the designated operational settings of the trip plan. Alternatively or additionally, identified differences may be categorized as non-anticipated route adhesion between one or more wheels of the vehicle and the route. Alternatively or additionally, identified differences may be categorized as non-anticipated cargo loads.

At 716, a determination is made to whether a responsive action to the identified problem with the route grade and/or health is required. The responsive action could include scheduling an inspection of the route at the grade error location. Alternatively or additionally, the responsive action could be to modify the designated operational settings of the trip plan during movement of the vehicle along the route. Alternatively or additionally, the responsive action could be to permanently update the one or more designated operational settings of the trip plan for future vehicle systems traveling along the route. Such updates could include one or more of changes to the designated power settings, changes to the designated speeds, changes to the designated grades, or the like. If it is determined that a responsive action is not required, flow of the method 700 proceeds towards 702. Alternatively, flow of the method proceeds towards 718 if it is determined that responsive action is required.

At 718, the responsive action identified at 716 is implemented. Flow of the method 700 then proceeds towards 702 to review a second rolling window predefined increment of distance (e.g., 2-miles, 5-miles, 10-miles, any other value of distance, etc) along the route. The method 700 continues until the vehicle has traveled the complete distance of the route.

In an embodiment, the system includes one or more processors configured to determine vehicle-controlled power settings of a vehicle as the vehicle moves along a route according to a trip plan. The trip plan dictating designated speeds and designated power settings of the vehicle at different locations along the route. The trip plan is based on designated grades of the route. The vehicle-controlled power settings are controlled to cause the vehicle to move toward the designated speeds of the trip plan. The one or more processors are configured to identify differences between the designated power settings of the trip plan and the vehicle-controlled power settings at which the vehicle is controlled to cause the vehicle to move toward the designated speeds of the trip plan. The one or more processors also are configured to determine discrepancies in the designated grades of the route based on the differences between the designated power settings of the trip plan and the vehicle-controlled power settings.

Optionally, the one or more processors of the system are configured to identify the one or more differences between the designated grades and the actual grades by determining whether the one or more differences between the designated grades and the actual grades are positive errors or negative errors. The one or more processors also are configured to determine an amount of correction to at least one of the designated grades that will reduce the one or more differences between the designated grades and the actual grades. The one or more processors are configured to determine an anomaly count of the differences between the designated power settings of the trip plan and the vehicle-controlled power settings, and to identify an error in a route database that stores the designated grades of the route responsive to the anomaly count exceeding a designated threshold margin.

Optionally, one or more processors also are configured to determine a route health index based on the one or more differences between the designated grades of the route and the actual grades of the route. The route health index is representative of an extent of damage to the route. The one or more processors of the system are configured to obtain environmental data representative of an ambient condition outside of the vehicle and to determine whether the one or more differences between the designated power settings of the trip plan and the vehicle-controlled power settings are caused by the ambient condition based on the environmental data.

Optionally, the one or more processors of the system are configured to determine an amount of adhesion between one or more wheels of the vehicle and the route and to determine whether the one or more differences between the designated power settings of the trip plan and the vehicle-controlled power settings are caused by the amount of adhesion. The one or more processors of the system are configured to determine a difference between designated vehicle cargo and actual vehicle cargo and to determine whether the one or more differences between the designated power settings of the trip plan and the vehicle-controlled power settings are caused by the difference between the designated vehicle cargo and the actual vehicle cargo.

Optionally, the one or more processors, responsive to determining the one or more differences between the designated power settings of the trip plan and the vehicle-controlled power settings, are configured to one or more of schedule inspection of the route, modify the trip plan during movement of the vehicle along the route, or update at least one of the designated grades of the route based on the one or more differences between the designated power settings of the trip plan and the vehicle-controlled power settings. The system is configured to control the vehicle for movement along the route based at least in part on the one or more differences between the designated grades of the route and actual grades of the route that are determined.

In an embodiment, the method includes determining vehicle-controlled power settings of a vehicle as the vehicle moves along a route according to a trip plan. The trip plan dictating designated speeds and designated power settings of the vehicle at different locations along the route. The trip plan is based on designated grades of the route. The vehicle-controlled power settings are controlled to cause the vehicle to move toward the designated speeds of the trip plan. The method includes identifying differences between the designated power settings of the trip plan and the vehicle-controlled power settings at which the vehicle is controlled to cause the vehicle to move toward the designated speeds of the trip plan. The method includes determining discrepancies in the designated grades of the route based on the differences between the designated power settings of the trip plan and the vehicle-controlled power settings.

Optionally, the method also includes identifying the one or more differences between the designated grades and the actual grades including determining whether the one or more differences between the designated grades and the actual grades are positive errors or negative errors. The method further determines an amount of correction to at least one of the designated grades that will reduce the one or more differences between the designated grades and the actual grades. The method determines an anomaly count of the differences between the designated power settings of the trip plan and the vehicle-controlled power settings and identifies an error in a route database that stores the designated grades of the route responsive to the anomaly count exceeding a designated threshold margin.

Optionally, the method includes determining a route health index based on the one or more differences between the designated grades of the route and the actual grades of the route, the route health index representative of an extent of damage to the route. The method also includes obtaining environmental data representative of an ambient condition outside of the vehicle and determining whether the one or more differences between the designated power settings of the trip plan and the vehicle-controlled power settings are caused by the ambient condition based on the environmental data. The method includes determining an amount of adhesion between one or more wheels of the vehicle and the route and determining whether the one or more differences between the designated power settings of the trip plan and the vehicle-controlled power settings are caused by the amount of adhesion. The method also includes determining a difference between designated vehicle cargo and actual vehicle cargo and determining whether the one or more differences between the designated power settings of the trip plan and the vehicle-controlled power settings are caused by the difference between the designated vehicle cargo and the actual vehicle cargo.

Optionally, the method further includes, responsive to determining the one or more differences between the designated power settings of the trip plan and the vehicle-controlled power settings, one or more of scheduling inspection of the route; modifying the trip plan during movement of the vehicle along the route; or updating at least one of the designated grades of the route based on the one or more differences between the designated power settings of the trip plan and the vehicle-controlled power settings. The method also includes controlling the vehicle for movement along the route based at least in part on the one or more differences between the designated grades of the route and actual grades of the route that are determined.

In an embodiment, the system includes a vehicle controller configured to determine vehicle-controlled power settings of a vehicle as the vehicle moves along a route according to a trip plan. The trip plan dictating designated speeds and designated power settings of the vehicle at different locations along the route. The trip plan is based on designated grades of the route. The vehicle-controlled power settings are controlled to cause the vehicle to move toward the designated speeds of the trip plan, wherein the vehicle controller also is configured to identify differences between the designated power settings of the trip plan and the vehicle-controlled power settings at which the vehicle is controlled to cause the vehicle to move toward the designated speeds of the trip plan. The vehicle controller is also configured to determine a route health index based on discrepancies in the designated grades of the route based on the differences between the designated power settings of the trip plan and the vehicle-controlled power settings, the route health index representative of an extent of damage to the route.

Optionally, the system includes the vehicle controller configured to determine one or more differences between the designated grades of the route and actual grades based on the differences between the designated power settings of the trip plan and the vehicle-controlled power settings.

In one embodiment, a system includes one or more processors configured to determine one or more ambient conditions in which a vehicle is to travel along one or more paths. The one or more processors also are configured to determine first power settings for the vehicle to travel along the one or more paths based on the one or more ambient conditions that are determined. The first power settings are determined to direct the vehicle to travel along a planned trajectory toward a designated location. The one or more processors also are configured to monitor movement of the vehicle while using the first power settings and to identify a discrepancy between the movement of the vehicle and the planned trajectory. The one or more processors also are configured to automatically modify at least some of the first power settings into different, second power settings based on the discrepancy that is identified. The one or more processors are configured to determine the second power settings to return the movement of the vehicle back toward the trajectory toward the designated location or along a different trajectory toward the designated location. The one or more processors are configured to communicate control signals to a propulsion system of the vehicle to automatically control the movement of the vehicle according to the second power settings.

Optionally, the vehicle is a marine vessel.

Optionally, the one or more ambient conditions include one or more of a weather condition, a condition of water waves, a condition of wind, a condition of water current, or a condition of water temperature.

Optionally, the one or more ambient conditions that are determined include an expected ambient condition, a forecasted ambient condition, or a default ambient condition.

Optionally, the one or more processors are configured to identify the discrepancy between the movement of the vehicle and the planned trajectory caused by an experienced ambient condition through which the vehicle moved differing from the expected ambient condition, the forecasted ambient condition, or the default ambient condition.

Optionally, the one or more processors are configured to determine the first power settings for a trip plan that dictates the first power settings to be implemented by the vehicle at one or more of different locations, times, or distances to cause the vehicle to move along the one or more paths at one or more speeds defined by the trajectory.

Optionally, the vehicle is a marine vessel, the trajectory is a course through water, the one or more ambient conditions include at least one of: a wind speed, a wind direction, a swell speed, a swell direction, a wave direction, a wave speed, a wave height, a presence of an ice floe, a direction of movement of the ice floe, a speed of the movement of the ice floe, or a presence of an ice sheet.

In one embodiment, a method includes determining one or more ambient conditions in which a vehicle is to travel along one or more paths and determining first power settings for the vehicle to travel along the one or more paths based on the one or more ambient conditions that are determined. The first power settings are determined to direct the vehicle to travel along a planned trajectory toward a designated location. The method also includes monitoring movement of the vehicle while using the first power settings, identifying a discrepancy between the movement of the vehicle and the planned trajectory, automatically modifying at least some of the first power settings into different, second power settings based on the discrepancy that is identified and to return the movement of the vehicle back toward the trajectory toward the designated location or along a different trajectory toward the designated location, and controlling a propulsion system of the vehicle to automatically control the movement of the vehicle according to the second power settings.

Optionally, the vehicle is a marine vessel.

Optionally, the one or more ambient conditions include one or more of a weather condition, a condition of water waves, a condition of wind, a condition of water current, or a condition of water temperature.

Optionally, the one or more ambient conditions that are determined include an expected ambient condition, a forecasted ambient condition, or a default ambient condition.

Optionally, the discrepancy that is identified between the movement of the vehicle and the planned trajectory is caused by an experienced ambient condition through which the vehicle moved differing from the expected ambient condition, the forecasted ambient condition, or the default ambient condition.

Optionally, the first power settings are determined for a trip plan that dictates the first power settings to be implemented by the vehicle at one or more of different locations, times, or distances to cause the vehicle to move along the one or more paths at one or more speeds defined by the trajectory.

Optionally, the vehicle is a marine vessel, the trajectory is a course through water, the one or more ambient conditions include at least one of: a wind speed, a wind direction, a swell speed, a swell direction, a wave direction, a wave speed, a wave height, a presence of an ice floe, a direction of movement of the ice floe, a speed of the movement of the ice floe, or a presence of an ice sheet.

In one embodiment, a system includes one or more processors configured to determine one or more ambient conditions in which a marine vessel is to travel along one or more water paths. The one or more processors also are configured to determine first operational settings for the marine vessel to travel along the one or more water paths based on the one or more ambient conditions of the water paths that are determined. The first operational settings are determined to direct the marine vessel to travel along a planned trajectory toward a designated location. The one or more processors also are configured to monitor movement of the marine vessel while using the first operational settings and to identify a discrepancy between the movement of the marine vessel and the planned trajectory. The one or more processors also are configured to automatically modify at least some of the first operational settings into different, second operational settings based on the discrepancy that is identified. The one or more processors are configured to determine the second operational settings to return the movement of the marine vessel back toward the trajectory toward the designated location or along a different trajectory toward the designated location.

Optionally, the one or more processors are configured to communicate control signals to a propulsion system of the marine vessel to automatically control the movement of the marine vessel according to the second operational settings.

Optionally, the first operational settings and the second operational settings include one or more of a heading, a rudder position, a rudder angle, or an amount of thrust.

Optionally, the one or more ambient conditions include one or more of a weather condition, a condition of water waves, a condition of wind, a condition of water current, or a condition of water temperature.

Optionally, the one or more ambient conditions that are determined include an expected ambient condition, a forecasted ambient condition, or a default ambient condition.

Optionally, the one or more ambient conditions include at least one of: a wind speed, a wind direction, a swell speed, a swell direction, a wave direction, a wave speed, a wave height, a presence of an ice floe, a direction of movement of the ice floe, a speed of the movement of the ice floe, or a presence of an ice sheet.

Optionally, the one or more processors are configured to determine the first operational settings for the marine vessel to travel along the one or more water paths based further on a depth of water of the one or more water paths.

Optionally, the one or more processors are configured to determine the first operational settings for the marine vessel to remain at least a first designated distance from a shoreline through a designated portion of the one or more water paths, no farther than a second designated distance from the shoreline through the designated portion of the one or more water paths, or at least the first designated distance but no farther than the second designated distance from the shoreline through the designated portion of the one or more water paths.

Optionally, the one or more processors are configured to determine the first operational settings for the marine vessel to travel along the one or more water paths based on at least one of the ambient conditions being a designated value and at least one other of the ambient conditions being measured by a sensor during movement of the marine vessel.

Optionally, the one or more processors are configured to monitor movements of other marine vessels and to change the first operational settings to avoid interactions with the other marine vessels.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second,", and "third," etc. are used merely as labels, and are not intended to impose numerical requirements on their objects. Further, the limitations of the following claims are not written in means-plus-function format and are not intended to be interpreted based on 35 U.S.C.(f), unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, communication unit, control system, etc) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element of a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
    one or more processors configured to determine one or more expected ambient conditions in which a vehicle is to travel along one or more paths, the one or more processors also configured to determine first power settings for the vehicle to travel along the one or more paths based on the one or more expected ambient conditions that are determined, wherein the first power settings are determined to direct the vehicle to travel along a planned trajectory toward a designated location,
    wherein the one or more processors also are configured to monitor movement of the vehicle while using the first power settings and to identify a discrepancy between the movement of the vehicle and the planned trajectory, the one or more processors configured to identify that the discrepancy between the movement of the vehicle and the planned trajectory is caused by experienced ambient conditions differing from the expected ambient conditions,
    the one or more processors also configured to automatically modify at least some of the first power settings into different, second power settings based on the discrepancy that is identified, the one or more processors configured to determine the second power settings to return the movement of the vehicle back toward the trajectory toward the designated location or along a different trajectory toward the designated location, and
    wherein the one or more processors are configured to communicate control signals to a propulsion system of the vehicle to automatically control the movement of the vehicle according to the second power settings.

2. The system of claim 1, wherein the vehicle is a marine vessel.

3. The system of claim 1, wherein the one or more expected ambient conditions include one or more of a weather condition, a condition of water waves, a condition of wind, a condition of water current, or a condition of water temperature.

4. The system of claim 1, wherein the one or more expected ambient conditions that are determined include one or more of a forecasted ambient condition or a default ambient condition.

5. The system of claim 1, wherein the one or more processors are configured to determine the first power settings for a trip plan that dictates the first power settings to be implemented by the vehicle at one or more of different locations, times, or distances to cause the vehicle to move along the one or more paths at one or more speeds defined by the trajectory.

6. The system of claim 1, wherein the vehicle is a marine vessel, the trajectory is a course through water, the one or more expected ambient conditions include at least one of: a wind speed, a wind direction, a swell speed, a swell direction, a wave direction, a wave speed, a wave height, a presence of an ice floe, a direction of movement of the ice floe, a speed of the movement of the ice floe, or a presence of an ice sheet.

7. A method comprising:
    determining one or more expected ambient conditions in which a vehicle is to travel along one or more paths;
    determining first power settings for the vehicle to travel along the one or more paths based on the one or more expected ambient conditions that are determined, wherein the first power settings are determined to direct the vehicle to travel along a planned trajectory toward a designated location,
    monitoring movement of the vehicle while using the first power settings;
    identifying a discrepancy between the movement of the vehicle and the planned trajectory, the discrepancy between the movement of the vehicle and the planned trajectory caused by experienced ambient conditions differing from the expected ambient conditions;
    automatically modifying at least some of the first power settings into different, second power settings based on the discrepancy that is identified and to return the movement of the vehicle back toward the trajectory toward the designated location or along a different trajectory toward the designated location; and
    controlling a propulsion system of the vehicle to automatically control the movement of the vehicle according to the second power settings.

8. The method of claim 7, wherein the vehicle is a marine vessel.

9. The method of claim 7, wherein the one or more expected ambient conditions include one or more of a weather condition, a condition of water waves, a condition of wind, a condition of water current, or a condition of water temperature.

10. The method of claim 7, wherein the one or more expected ambient conditions that are determined include one or more of a forecasted ambient condition or a default ambient condition.

11. The method of claim 7, wherein the first power settings are determined for a trip plan that dictates the first power settings to be implemented by the vehicle at one or more of different locations, times, or distances to cause the vehicle to move along the one or more paths at one or more speeds defined by the trajectory.

12. The method of claim 7, wherein the vehicle is a marine vessel, the trajectory is a course through water, the one or more expected ambient conditions include at least one of: a wind speed, a wind direction, a swell speed, a swell direction, a wave direction, a wave speed, a wave height, a presence of an ice floe, a direction of movement of the ice floe, a speed of the movement of the ice floe, or a presence of an ice sheet.

13. A system comprising:
one or more processors configured to determine one or more ambient conditions in which a marine vessel is to travel along one or more water paths, wherein the one or more ambient conditions that are determined include an expected ambient condition, a forecasted ambient condition, or a default ambient condition, the one or more processors also configured to determine first operational settings for the marine vessel to travel along the one or more water paths based on the one or more ambient conditions of the water paths that are determined, wherein the first operational settings are determined to direct the marine vessel to travel along a planned trajectory toward a designated location,
wherein the one or more processors also are configured to monitor movement of the marine vessel while using the first operational settings and to identify a discrepancy between the movement of the marine vessel and the planned trajectory, wherein the discrepancy between the movement of the vehicle and the planned trajectory is caused by experienced ambient conditions differing from the ambient conditions,
wherein the one or more processors also configured to automatically modify at least some of the first operational settings into different, second operational settings based on the discrepancy that is identified, the one or more processors configured to determine the second operational settings to return the movement of the marine vessel back toward the trajectory toward the designated location or along a different trajectory toward the designated location.

14. The system of claim 13, wherein the one or more processors are configured to communicate control signals to a propulsion system of the marine vessel to automatically control the movement of the marine vessel according to the second operational settings.

15. The system of claim 13, wherein the first operational settings and the second operational settings include one or more of a heading, a rudder position, a rudder angle, or an amount of thrust.

16. The system of claim 13, wherein the one or more ambient conditions include one or more of a weather condition, a condition of water waves, a condition of wind, a condition of water current, or a condition of water temperature.

17. The system of claim 13, wherein the one or more ambient conditions include at least one of: a wind speed, a wind direction, a swell speed, a swell direction, a wave direction, a wave speed, a wave height, a presence of an ice floe, a direction of movement of the ice floe, a speed of the movement of the ice floe, or a presence of an ice sheet.

18. The system of claim 13, wherein the one or more processors are configured to determine the first operational settings for the marine vessel to travel along the one or more water paths based further on a depth of water of the one or more water paths.

19. The system of claim 13, wherein the one or more processors are configured to determine the first operational settings for the marine vessel to remain:
at least a first designated distance from a shoreline through a designated portion of the one or more water paths;
no farther than a second designated distance from the shoreline through the designated portion of the one or more water paths; or
at least the first designated distance but no farther than the second designated distance from the shoreline through the designated portion of the one or more water paths.

20. The system of claim 13, wherein the one or more processors are configured to determine the first operational settings for the marine vessel to travel along the one or more water paths based on at least one of the ambient conditions being a designated value and at least one other of the ambient conditions being measured by a sensor during movement of the marine vessel.

21. The system of claim 13, wherein the one or more processors are configured to monitor movements of other marine vessels and to change the first operational settings to avoid interactions with the other marine vessels.

* * * * *